United States Patent [19]
Mizutani et al.

[11] Patent Number: 4,933,797
[45] Date of Patent: Jun. 12, 1990

[54] ARRANGEMENT FOR PREVENTING ENTRANCE OF HARMFUL PARTICLES FOR USE IN A CARTRIDGE

[75] Inventors: Hikaru Mizutani, Minoo; Kunio Wakai; Hideo Fujiwara, both of Ibaraki; Hideaki Niimi, Tsuchiura; Noboru Isoe, Toride; Toshio Doi, Tama, all of Japan

[73] Assignee: Hitachi Maxell Ltd., Osaka, Japan

[21] Appl. No.: 255,451

[22] Filed: Oct. 7, 1988

[30] Foreign Application Priority Data

Oct. 8, 1987 [JP] Japan .................. 62-252353
Nov. 9, 1987 [JP] Japan .................. 62-282768
Nov. 11, 1987 [JP] Japan .................. 62-282951
Mar. 14, 1988 [JP] Japan .................. 62-61691

[51] Int. Cl.$^5$ .......................... G11B 23/087
[52] U.S. Cl. ................................. 360/132
[58] Field of Search ............... 360/132; 242/198, 199

[56] References Cited
U.S. PATENT DOCUMENTS 4,607,308 8/1986 Tsuruta et al. .................. 360/132
4,682,259 7/1987 Okamura et al. ................ 360/132

*Primary Examiner*—Robert S. Tupper
*Attorney, Agent, or Firm*—Birch, Stewart, Kolasch & Birch

[57] ABSTRACT

In a recording tape cartridge having a cartridge case, magnetic recording tape and a front lid and a rear lid for protecting the magnetic tape, there are provided entrance preventing members at a bottom the cartridge case facing to clearances between side edges of the front lid and case body for preventing entrance of harmful floating particles into the area near the recording tape so as to prevent corrosion of the recording tape.

4 Claims, 14 Drawing Sheets

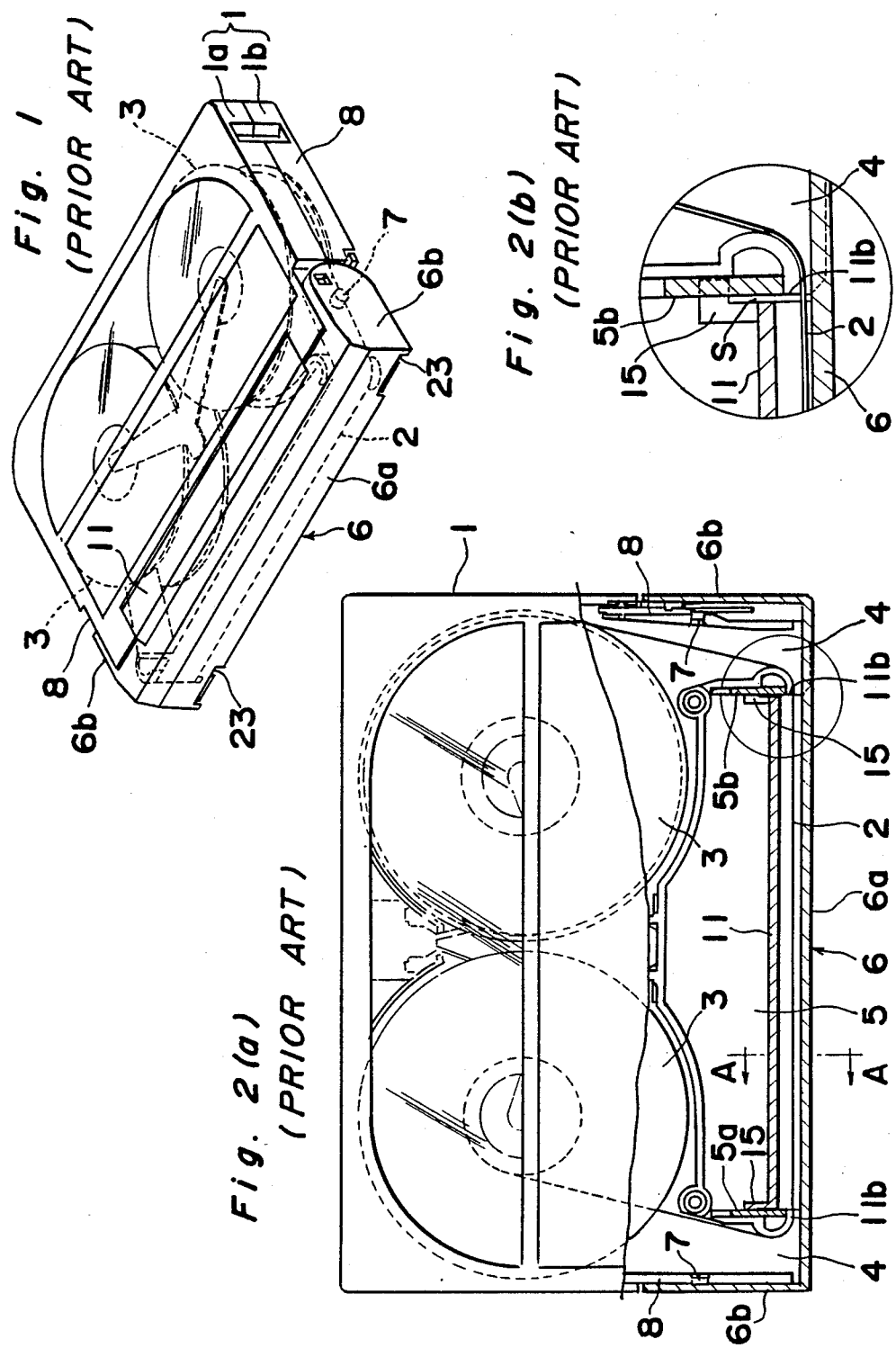

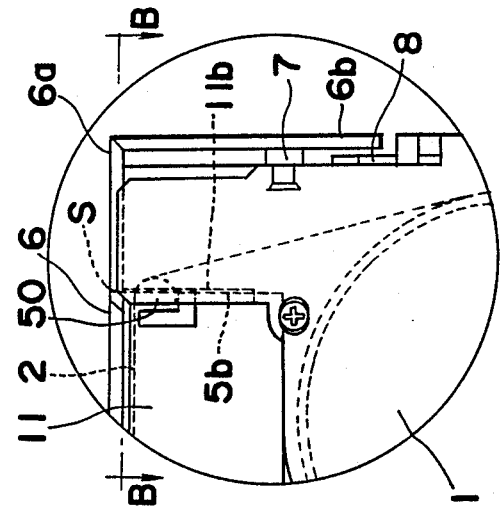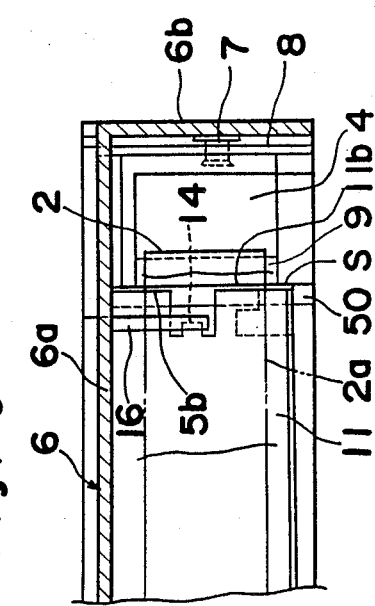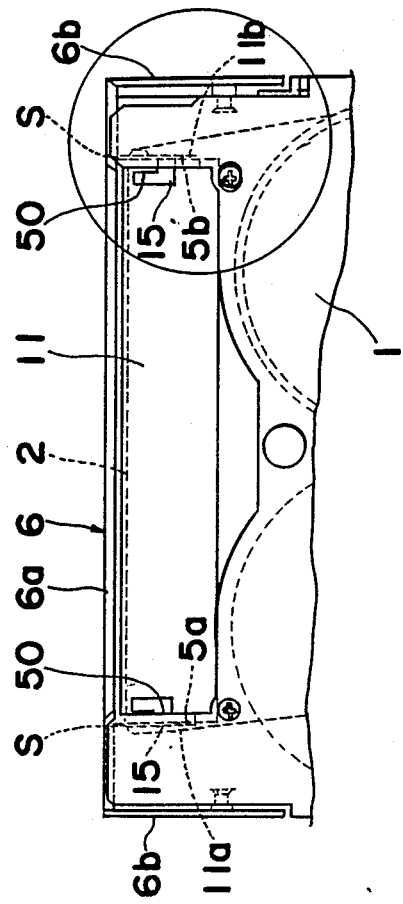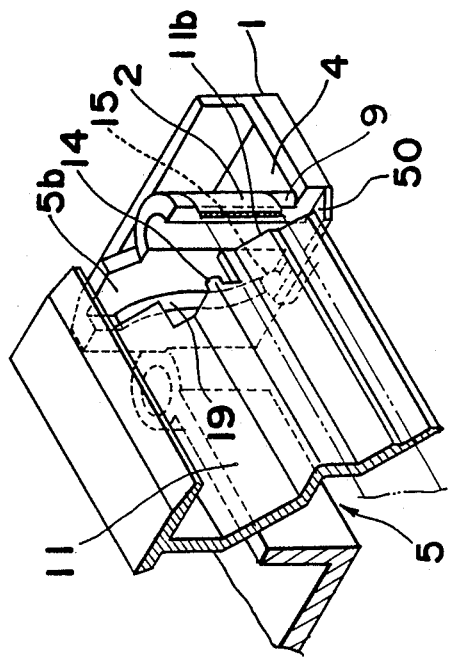

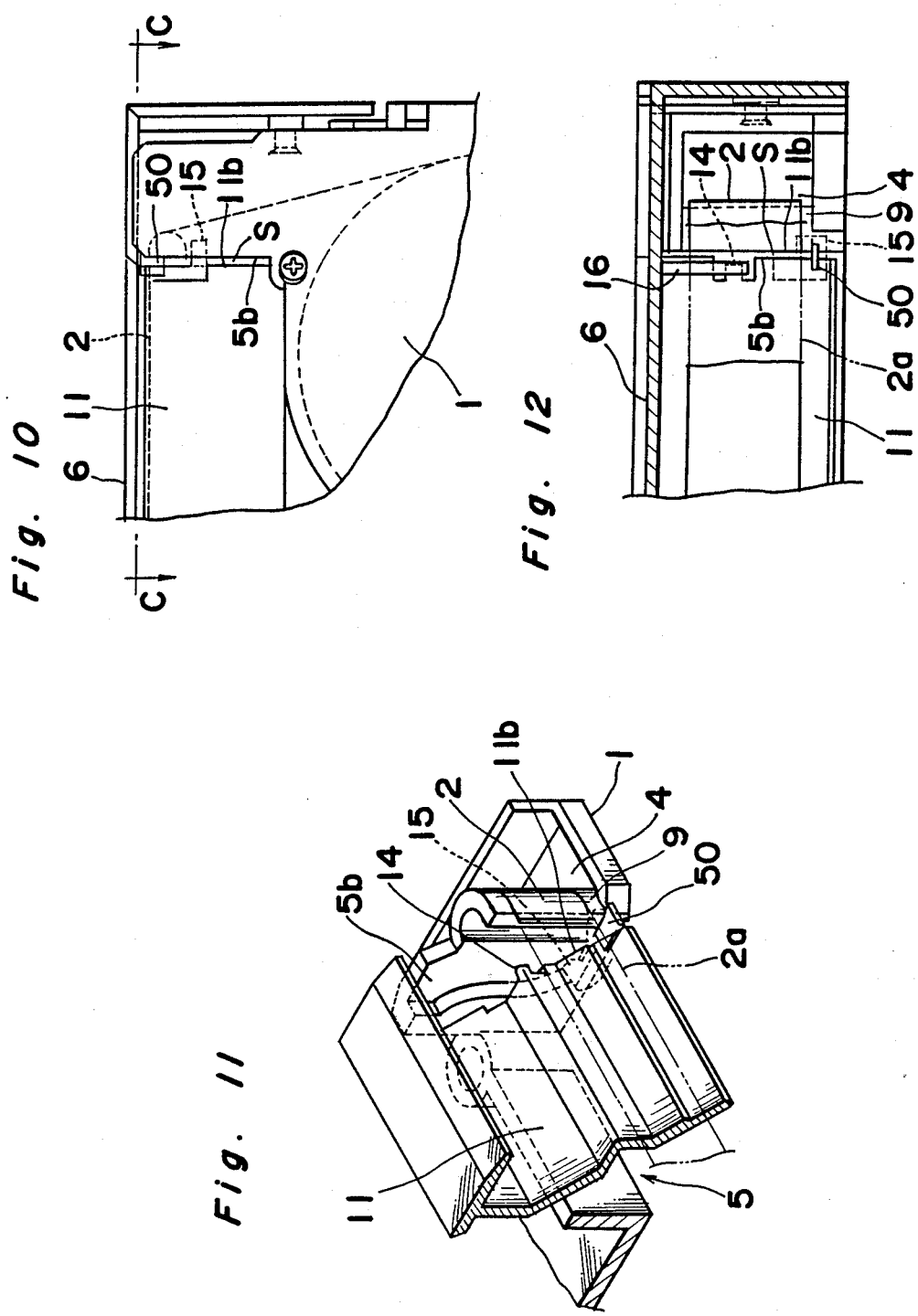

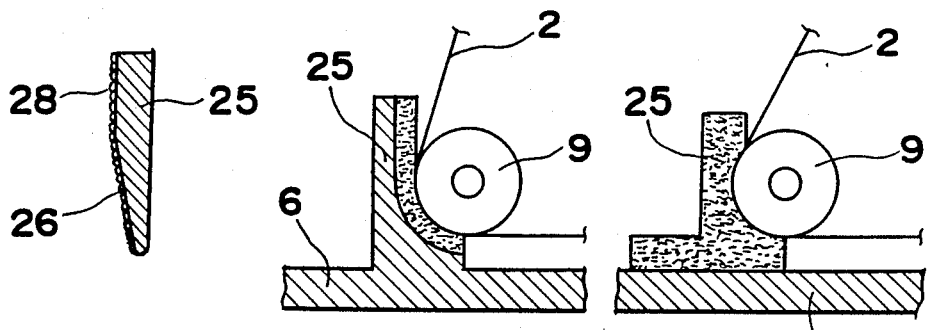
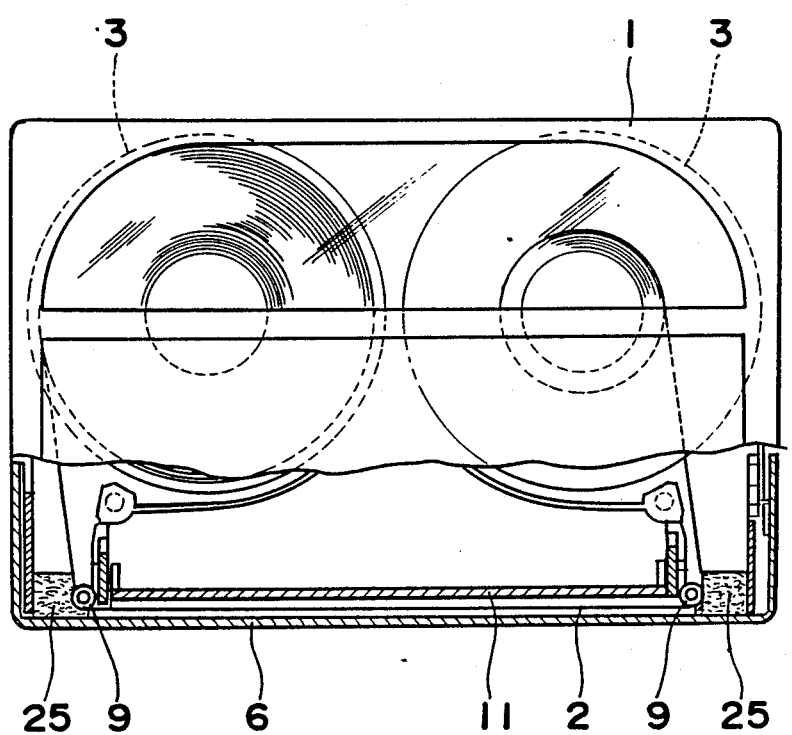

ARRANGEMENT FOR PREVENTING ENTRANCE OF HARMFUL PARTICLES FOR USE IN A CARTRIDGE

BACKGROUND OF THE INVENTION

1. Field of the Invention

The present invention relates to a tape cartridge, and more particularly to a tape cartridge housing a metal recording medium such as a magnetic recording tape.

2. Description of the Prior Art

FIGS. 1 to 6 show an example of a conventional tape cartridge, wherein a case body 1 is formed by assembling a top case half 1a and a bottom case half 1b made of plastic resin material together so that a pair of tape reels 3 are rotatably installed in the left and right portions of the case body 1. There is defined a pair of tape drawing openings 4 at the side end portions or left and right end portions in the front face of the case body 1. A pocket 5 for the tape loading is defined at the central portion of the case body in such a manner that the pocket 5 is expanded towards the inside of the case body 1 between the left and right tape drawing openings 4. In this arrangement, the magnetic tape 2 is taken out of one of the tape reels 3 through the tape drawing opening facing to the tape reel 3 which releases the recording tape, and the released tape is advanced toward the front side of the pocket 3, then introduced in the other tape drawing opening and taken up by the other tape reel 3 in a known manner.

A front lid 6 is mounted on the front part of the case body 1 for covering and protecting the front surface or recording surface of the magnetic tape 2 extending between the tape drawing openings 4. The front lid 6 is made of plastic resin and comprises a front wall 6a extending in a lateral direction so as to close the entire length of the front part of the case body 1, side arms 6b projected backward of the case body from both side ends of the front wall 6a and pivotal shafts 7 projected from the inner surfaces of the side arms 6b. The front lid 6 is pivotally mounted on both side walls 8 of the case body 1 by rotatably engaging the pivotal shafts 7 in recesses defined in the side walls 8, so that the front lid 6 is movable between a closed position or down position at which the front lid 6 covers the front face of the magnetic tape 2 as shown in the real line in FIG. 3 and up position or open position at which the front side of the magnetic tape 2 is opened, as shown in chain lines in FIG. 3. The front lid 6 is normally exerted toward the closed position by a resilient member (not shown) engaged with one of the pivotal shafts 7.

There is provided a rear lid 11 on the rear side of the front lid 6 in the area where the pocket 5 for the tape loading is defined. When the tape cartridge is not used, the rear lid 11 covers the rear surface of the magnetic tape 2, more specifically the rear lid 11 covers the inner side as well as the lower part of the magnetic tape 2 and the upper opened part of the pocket 5.

The rear lid 11 is made of plastic resin and is formed by molding with a generally T character shape in a cross sectional view, as shown in FIG. 3. The rear lid 11 comprises a slanted wall 12 for covering the rear face of the the magnetic tape 2, a top wall 13 projected from the top edge of the slanted wall 2 for covering the upper opening of the pocket 5, a pair of pivotal shafts 14 projected from the central area of both side edges 11a and 11b of the slanted wall 12 and a pair of sliding shafts 15 provided at the portions lower than the pivotal shafts 14 of the side edges 11a and 11b. The pivotal shafts 14 are rotatably engaged with the shaft supporting members 16 projected backward from the rear surface of the front lid 6 with the sliding shafts 15 slidably engaged in S shaped guide slots 18a and 18b which are respectively defined on the inner surface of the rear lid guide walls 5a and 5b in the pocket 5. The guide slots 18a and 18b are formed by assembling the guide walls 5a and 5b of the top case half 1a and the bottom case half 1b, as shown in FIG. 4.

The front lid 6 and the rear lid 11 can be opened upward from the closed position shown in the real line in FIG. 3. That is, when the front lid 6 is moved upward to its open position from the closed position, the rear lid 11 is also rotated with the movement of the front lid 6 around the pivotal shafts 14 and moved upward along the guide slots 18a and 18b, being opened upward as shown in the chain lines A in FIG. 3.

In the conventional tape cartridge as explained above, in order to facilitate the movement of the rear lid 11, there are defined clearances S between the lateral edges 11a and 11b of the rear lid 11 and rear lid guide walls 5a and 5b, as shown in FIGS. 5 and 6. Therefore, even when the rear lid 11 is in the closed position, a very small part of the magnetic tape 2 is visible directly from the outside of the case body 1 through the clearances S. Thus, harmful substance the air enters in the case body 1 through the clearances S and undesirably adheres to the magnetic tape 2 particularly the lower edge portion of the tape resulting in an undesired problem of corrosion of the magnetic tape 2 in case the magnetic tape is provided with a magnetic layer made of metallic material such as cobalt, cobalt-nickel, or cobalt phosphorus formed on a non magnetic substrate such as plastic resin film. It has been observed that in particular, such corrosion is apt to occur in the evaporated magnetic tape formed without binder.

Such harmful substances are sulfur, chlorine and other various floating substances of compounds or mist of sulfuric acid and nitric acid. Such harmful substance mentioned above is referred to as floating harmful particles hereinafter.

SUMMARY OF THE INVENTION

An essential object of the present invention is to provide an arrangement for preventing corrosion of the magnetic recording medium in a cartridge by floating, harmful particles.

Another object of the present invention is to provide an arrangement for preventing entering of floating, harmful particles into a cartridge case through one or more clearances with a relatively simple structure.

A further object of the present invention is to provide a tape cartridge of the type comprising a magnetic tape with the magnetic layer made of metallic material, a front lid and rear lid for protecting the magnetic tape, the tape cartridge being capable of eliminating corrosion of the magnetic tape by the harmful floating particles by preventing entrance of the harmful floating particles in the air through clearance between the rear lid and the case body assuring smooth movement of the front lid and rear lid.

According to one aspect of the present invention, there is provided a tape cartridge of the type mentioned above, in which one or more wall members are provided for covering or closing one or more openings through which the floating harmful particles may enter into the cartridge case, so that the floating harmful particles are prevented from entering into the cartridge case, whereby corrosion of the magnetic recording tape or disc can be avoided.

BRIEF DESCRIPTION OF THE DRAWINGS

FIG. 1 is a perspective view showing an example of conventional tape cartridge,

FIG. 2a is a top plan view of the tape cartridge shown in FIG. 1 with a part thereof broken, FIG. 2b, is a enlarged top plan view of a part circled in FIG. 2a, FIG. 3 is a cross sectional view showing the front lid and rear lid in the tape cartridge shown in FIG. 1, FIG. 7a is a partial top plan view showing an embodiment of the tape cartridge according to the present invention, FIG. 7b is an enlarged view of a part circled in FIG. 7a, FIG. 8 is a partial perspective view of the embodiment shown in FIG. 7a, FIG. 9 is a cross sectional view taken along the line B—B in FIG. 7a, FIG. 10 is a partial top plan view showing a second embodiment of the tape cartridge according to the present invention, FIG. 11 is a perspective view showing a essential part of the second embodiment shown in FIG. 10, FIG. 12 is a cross sectional view taken along the lines C—C in FIG. 10, FIG. 25 is a plan view showing an essential portion of the fourth modification, FIG. 26 is partial plan view showing a fifth modification of the tape cartridge according to the present invention, FIG. 27 is a partial plan view showing a sixth modification of the tape cartridge according to the present invention, FIG. 28 is a plan view showing a seventh modification of the tape cartridge according to the present invention.

DETAILED DESCRIPTION OF THE PREFERRED EMBODIMENTS

Figure 3:
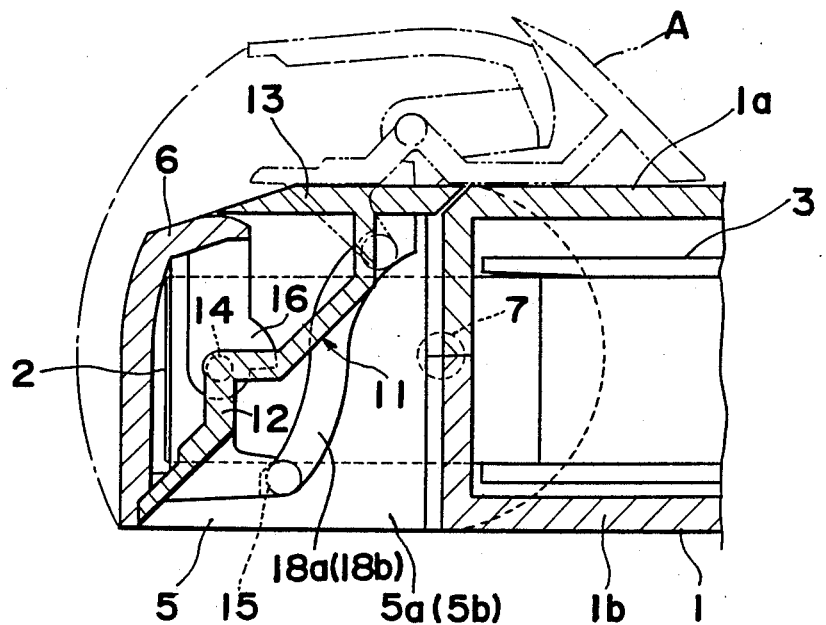
Figure 5:
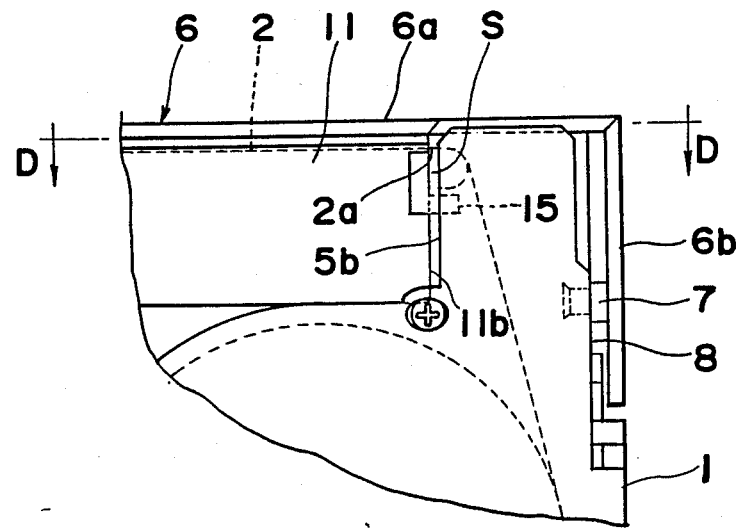
FIG. 5 is a bottom plan view of a part of the tape cartridge shown in FIG. 1.
Figure 4:
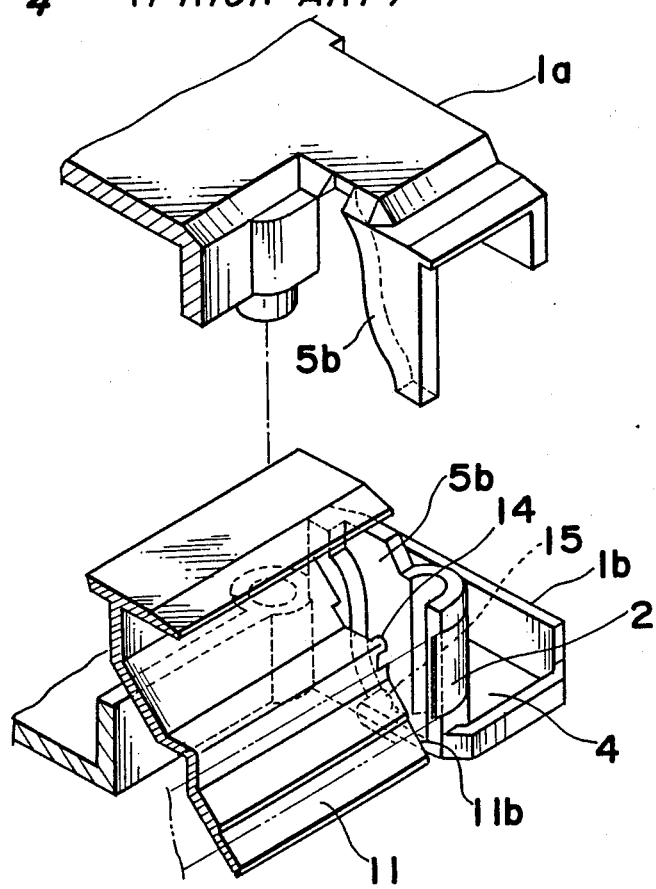
FIG. 4 is an exploded perspective view of an essential portion of the tape cartridge shown in FIG. 1.
Figure 6:
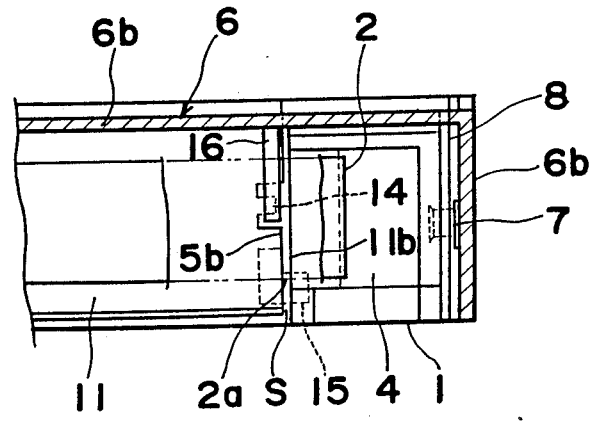
FIG. 6 is a cross sectional view taken along lines D—D in FIG. 5.

Before the description proceeds, it is noted that since the basic structure of the tape cartridge is similar to those of the conventional tape cartridge explained with reference to FIGS. 1 to 6, like parts are designated by the same reference numerals and the explanation of details thereof is herein omitted for brevity.

Embodiment 1

The first embodiment of the tape cartridge according to the present invention will be explained with reference to FIGS. 7 to 9.

Referring to FIG. 7, a pair of particle entrance preventing walls 50 are formed at respective areas near a tape path regulating pin 9 and between the rear lid guide walls 5a and 5b and the respective left and right side edges 11a and 11b of the rear lid 11 to be projected from the respective rear lid guide walls 5a and 5b so as to close the respective clearances S therebetween for preventing entrance of the harmful floating particles into the inside of the cartridge case 1 through the clearances S.

More specifically, as shown in FIGS. 8 and 9, the particle entrance preventing wall 50 on the right side is continued to the bottom wall of the bottom case half 1b and is projected from the rear lid guide wall 5b to extend toward the pocket 5 between the opposed surfaces of the right side edge 11b of the rear lid 11 and the rear lid guide wall 5b. The particle entrance preventing wall 50 is adapted to extend from the front end of the bottom case half 1b in such a manner that the upper surface of the particle entrance preventing wall 50 is directly connected with the front surface of the bottom of the rear wall surface 19. The rear lid 11 has its right side part thereof extended a little longer than the rear lid of the conventional cartridge so that the right side edge 11b of the rear lid 11 is situated above the particle entrance preventing wall 50, thereby causing the clearance S defined between the opposed surfaces of the right side edge 11b and the surface of the rear guide wall 5b to be entirely closed by the particle entrance preventing wall 50 when viewed from below the pocket 5. In a similar manner, there is formed the particle entrance preventing wall 50 for the left side between the opposed surfaces of the left side edge 11a of the rear lid 11 and the rear lid guide wall 5a.

In the arrangement mentioned above, it is possible to eliminate such a deficiency that the harmful floating particles in the air enter inside of the cartridge case 1 through the clearances S between the left and right side edges 11a, 11b of the rear lid 11 and rear lid guide walls 5a and 5b and the harmful particles adhere to the parts of the magnetic tape 2 opposing to the clearances S.

The magnetic tape 2 is formed in such a manner that the magnetic layer made of metallic magnetic material is formed on one surface of the non magnetic substrate with a back coat layer formed on the other surface of the substrate.

As the non magnetic substrate, there may be used a polyethylene terephthalate film, a polyimide film or a polysulfon film.

As the metallic magnetic material, alloys of Fe, Co, Co-Ni, Co-Cr, Co-P, Co-Ni-P, Co-Ni-Fe, Co-Ni-Cr, Co-Fe, Co-Fe-Cr, Co-Fe-Ni, Co-Ti and Co-Cu. As the way of forming the magnetic layer, there may be used evaporation, sputtering, CVD method, ion plating and coating using binder. However, in the present invention, it is effective to form the magnetic layer using the any ways without the binder.

There may be formed a protecting layer on the magnetic layer using lubricanting agents and/or rust preventatives. As the backcoating layer there may be used aliphatic compounds, fluorine compounds and silicon compounds.

As the aliphatic lubricants, there may be used fatty acid, metal salt of fatty acid, ester of fatty acid, fatty acid amide and fatty acid alcohol.

As the fluorine lubricants, there may be used trichlorofluoroethylene, perfluoroethylene, perfluoropolyether, perfluoroalkylpolyether, and perfluoroalkylcarboxylate.

As the silicone lubricants, there may be used silicone oil and modified silicone oil.

As the hydrocarbon lubricants, there may be used paraffin, squlane and wax.

It is possible to add the rust preventatives with the lubricants for the backcoat layer.

As the rust preventatives, there may be used 2-pentylaminobenzimidazole, 2-mercaptobenzothiazole, sorbitan-monopalmitate, 5-methylbenzotriazole, 2-nitroso-1-naphtol, ferricyanate and ferrocyanate.

Embodiment 2

Referring to FIGS. 10 to 12 showing the second embodiment of the present invention, the difference between the first embodiment and second embodiment is in that in the first embodiment, the particle entrance preventing wall 50 is formed from the front end portion of the case body 1 to the bottom of the wall 19 so that the clearance S are closed over the entire length thereof in terms of the front to back direction of the case body 1, on the other hand, in the second embodiment, the particle entrance preventing wall 50 is projected from the rear lid guide walls 5a and 5b with such a small width member situated below only across the clearance S in such a manner that only the clearance S between the opposed surfaces of the lower portions of the side edge 11a or 11b of the rear lid 11 and the rear lid guide walls 5a or 5b is closed.

In case only the respective clearances S between the opposed surfaces of the side edge 11a or 11b of the rear lid 11 and the rear lid guide wall 5a or 5b, there can be obtained the effect of preventing the corrosion of the lower edge of the magnetic tape 2. This is based on the fact that the corrosion of the magnetic tape 2 due to the floating harmful particles occur most remarkably at the lower edge portion 2a of the magnetic tape 2 which most adjacently faces to the clearances S.

In the second embodiment, the lower portions of both of the left and right side edges 11a and 11b reach below the lower face of the particle entrance preventing wall 50 when the rear lid 11 is closed. In this case, if the the lower portions of both of the left and right side edges undesirably engage with the particle entrance preventing wall 50, there may be formed cut portions in both of the left and right side edges 11a and 11b to avoid the undesired engagement.

Other embodiments

In the first and second embodiments, the particle entrance preventing walls 50 are projected from the rear guide walls 5a and 5b of the case body 1. However, in the present invention, it is essential that the clearances S between both of the left and right side edges 11a and 11b of the rear lid 11 are closed by the particle entrance preventing wall 50, which may be projected from the rear lid 11 or may be projected from both of the case body 1 and rear lid 11.

In the embodiments mentioned above, the particle preventing walls 50 are stationary, it may be arranged as movable members which are movable with the movement of the front lid or rear lid so long as the movable members close the clearances S when the front lid is in the closed position.

Although the respective embodiments are employed in such tape cartridge that the rear lid 11 is moved in association with the front lid 6, the arrangement of the present invention may be applied to other types of a tape cartridge having a lid mechanism which the front lid and rear lid are moved independently.

Modifications

Figure 13:
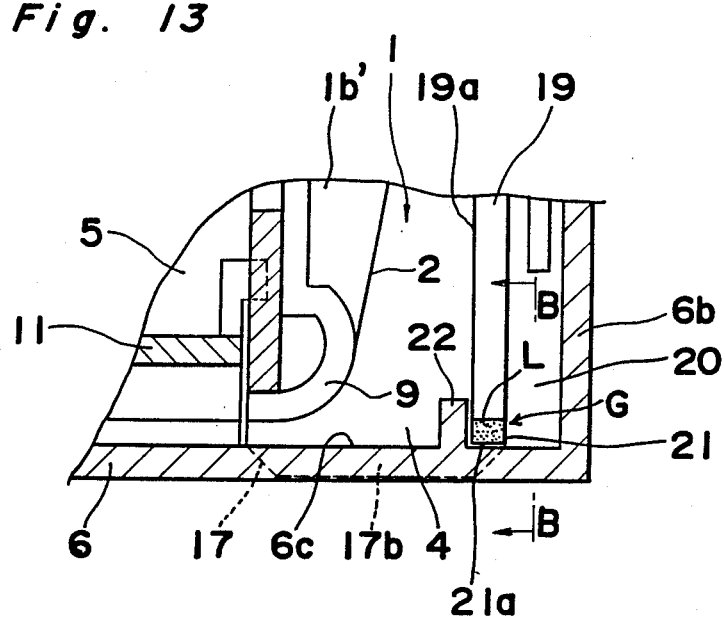
FIG. 13 is a top plan view showing a first notification of the tape cartridge with partially broken.
Figure 14:
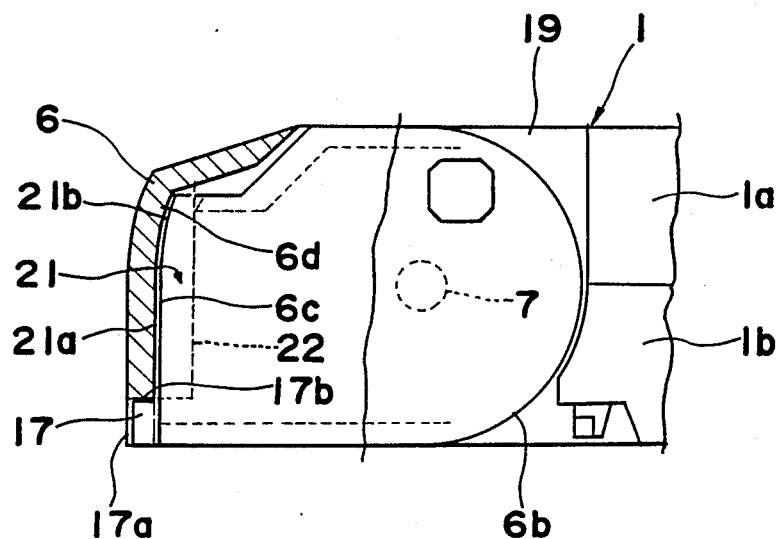
FIG. 14 is a cross sectional view taken along the lines B—B in FIG. 13.
Figure 15:
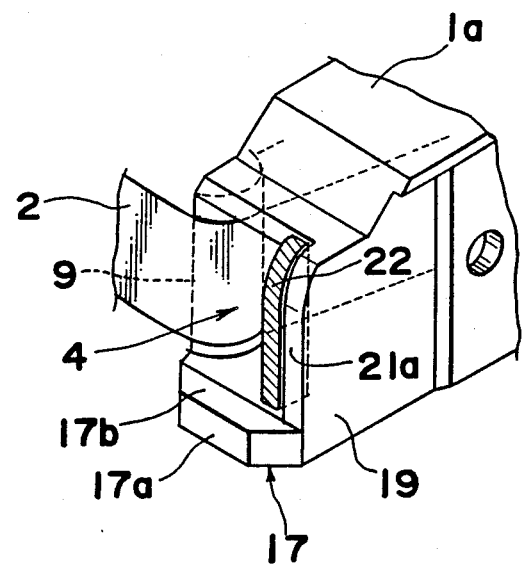
FIG. 15 is a partial perspective view of the first modification.

It is noted that in the description hereinafter, the particle entrance preventing arrangement will be explained with respect to only one of both side walls, however, the same arrangement may be provided on the other side wall of the case body. First modification Referring to FIGS. 13, 14 and 15 showing a first modification of the particle entrance preventing wall 50, there is formed a standing front wall 21 expanded from a side wall 19 of the case body 1 which is the combination of the side walls of the top and bottom halves 1a and 1b and provides an outer wall defining the tape drawing opening 4. The front surface 21a of the standing front wall 21 is expanded toward the front part than the real line L with such a shape as to conform to the inner wall surface 6c of the front lid 6 situated in the closed position so that the front surface 21a strictly contacts the inner wall surface 6c. In FIG. 13, the standing front wall 21 is depicted with dots.

Figure 16:
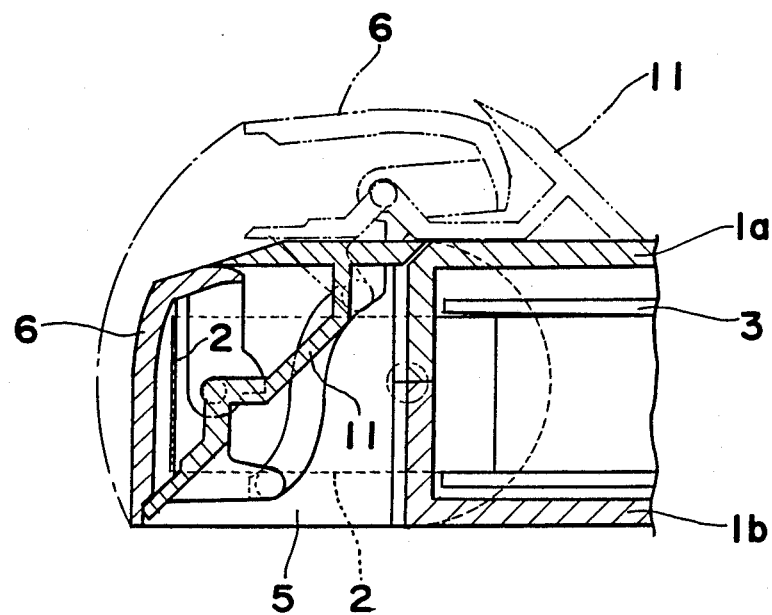
FIG. 16 is a cross sectional view taken along the lines A—A in FIG. 2a, FIG. 17 is a cross sectional view showing a second modification of the tape cartridge according to the present invention.

As shown in FIG. 14, when the front lid 6 is closed, the lower half of the inner wall surface 6c stands almost vertical manner but the upper half 6d of the inner wall surface is bent backward so that when the front lid is fully opened, as shown in phantom lines in FIG. 16, the amount of projection of the front lid in the upper direction is decreased. It is noted that the inner wall surface of the upper half 6d of the front lid is bent by a radius of curvature R1 because the thickness of the front lid 6 must be uniform in order to suppress shrinkage in the front lid at the time of molding of the front lid 6. The center of the radius of curvature R1 is situated substantially at the center of the pivotally shaft 7 i.e., the rotation center of the front lid 6. Therefore, the shape of the front surface of the standing wall 21 is so defined that the lower half is vertical but the upper half is bent with a radius curvature R2 which is substantially equal to the radius of curvature R1 so that the front edge 21a can oppose to the inner wall surface 6c of the front lid 6 very closely keeping a very small gap. That is the dimension of the standing wall 21 and the front lid is so defined that a limit of the movement of the front lid 6 toward the closed position is set in such a manner that the top end of the cut portion 23 shown in FIG. 1 engages with the upper end 17b of the wall 17, whereby the very small gap between the front edge 21a and the inner wall surface 6c mentioned above is kept. However, the dimension at the time of design is so designed that the inner wall surface 6c does not contact with the front edge 21a of the standing wall 21 earlier than contact of the cut portion 23 with the projection wall 17, in fact, the inner wall surface 6c substantially contacts entirely with the front surface 21a of the standing wall 21.

There is provided an elongated wall member 22 extending in a longitudinal direction, which is formed to be expanded in the frontward direction from the inner wall 6c and is adapted to be overlapped with an inner vertical wall surface 19a of the side wall 19 of the case body 1 in a face to face contact manner when the front lid 6 is in the closed position. In the arrangement mentioned above, when the cartridge is not in use and the front lid 6 is closed, a large gap G (see FIG. 13) between the side wall 19 and the inner wall surface 6c of the front lid 6, which gap is present in the conventional cartridge, can be closed by the standing wall 21 of the side wall 19. Even if there is formed a small clearance between the front edge 21a of the standing wall 21 and the inner surface 6c of the front lid 6 due to an inaccuracy of size at the molding of the cartridge and a play in the pivoting portion in addition to the thermal deformation, the inner surface of the inner wall surface 6c is closed by the wall member 22 and the small clearance can be closed by the wall member 22. In addition, the wall member 22 effects a surface contact with the inner wall 19a of the side wall 19. Accordingly, air can be prevented from entering the case body 1 and reaching up to the tape drawing opening 4 in the case body 1 through the outside of the side wall 19, particularly space 20 in the right part. Since the wall member is disposed away from a tape path regulating pin 9, the wall member 22 does not engage with the magnetic tape 2.

Although a pair of the standing walls 21 are provided on both left and right side walls 19 of the case body 1, the standing wall 21 may be provided only on one side of the case body on which the space 20 is present. The same can be said about the wall member 22.

It is possible to arrange the front lid 6 in such a manner that the inner surface 6c contacts with the front edge 21a of the standing wall 21 first so that the movement of the front lid 6 is limited.

Moreover, in place of making the standing wall 21 and the side wall 19 one body extending the former from the latter, it is possible to make the standing wall 21 with rubber material separately from the side wall 19, and then attach the standing wall 21 to the front surface of the side wall 19. It is also possible to make the wall member 22 and the front lid 6 separately, then to attach the wall member 22 to the front lid 6.

Second modification

Figure 17:
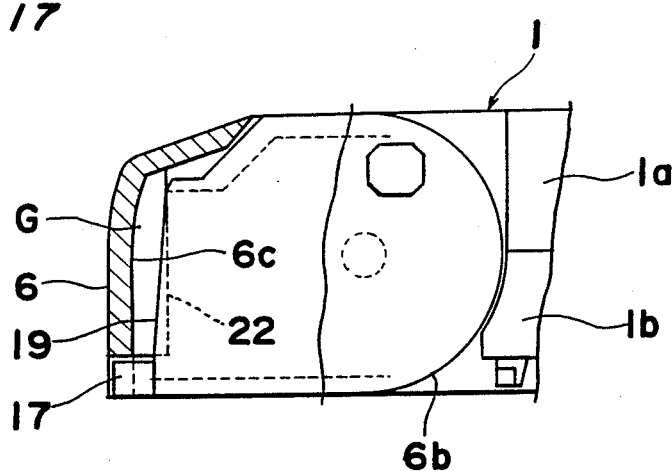

FIG. 17 shows a second modification of the particle entrance preventing arrangement according to the present invention, wherein the standing wall 21 is omitted but the wall member 22 is provided on the inner face 6c of the front lid 6 so as to close the clearance G between the front face of the side wall 19 and the inner wall 6c of the front lid 6. By the arrangement mentioned above, it is possible to prevent entrance of the harmful particles into the inside of the case body by enhancing the contact between the wall member 22 and the standing wall surface 19a of the side wall 19. The other structure is similar to the structure of the various embodiments mentioned above.

Third modification

Figure 18:
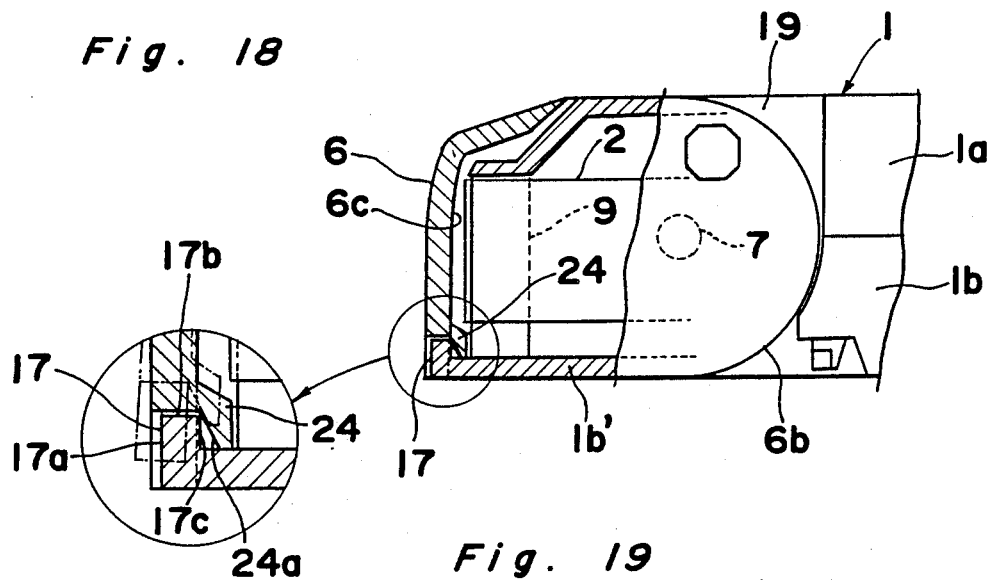
FIG. 18 is a cross sectional view showing a third modification of the tape cartridge according to the present invention.
Figure 19:
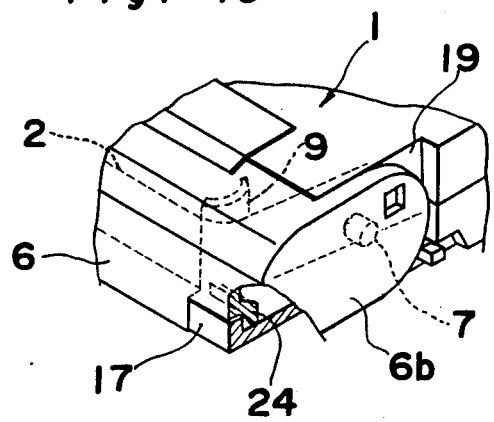
FIG. 19 is a perspective view showing an essential portion of the third modification.

Referring to FIGS. 18 and 19 showing the third modification of the particle entrance preventing arrangement of the present invention in which a closing wall member 24 having a generally reversed L character shape is projected from the lower portion of the front lid 6 corresponding to and above the projection wall 17 across its lateral direction or the left and right direction at an area above the cut portion 23 in the inner wall surface 6c of the front lid 6 when the front lid 6 is situated at the closed position so that the closing wall member 24 is situated over the projection wall 17 entering into the inner side of the projection wall 17. The wall member 24 has its lower surface 24a slanted inwardly so that, when the front lid 6 is closed, the slanted wall 24a can face to the wall member 17. It is essential that the front lid 6 can be closed or opened without any undesired engagement between the wall member 17 and the slanted wall 24a.

In the arrangement mentioned above, when the front lid 6 is closed such that the tape cartridge is not in use, if the front lid 6 is unexpectedly moved upward a little due to external force or play in the pivotal axis, there is formed a large gap between the upper surface of the cut portion 23 and upper surface 17b of the projection wall 17. However, since the slanted wall 24a of the wall member 24 faces very closely to the inner surface of the projection wall 17, the slanted wall 24a can prevent entrance of the air containing the floating particles into the tape drawing opening 4.

In the third modification, the slanted wall 24a of the wall member 24 may be modified in such a shape comprising rectangular surfaces that is a combination of a horizontal surface and a vertical surface. It is not essential that the slanted wall 24a contact with the inner surface of the bottom wall 1b' of the lower case half 1b.

Also it is not essential to provide the cut portion 23 in the front lid 6. There may be employed such a configuration that the inner wall 6c of the front lid 6 contacts with the front surface 17a of the projection wall 17.

The wall member 24 may be made separately from the front lid 6 and the wall member 24 separately formed may be attached to the front lid 6.

Fourth modification

Figure 20:
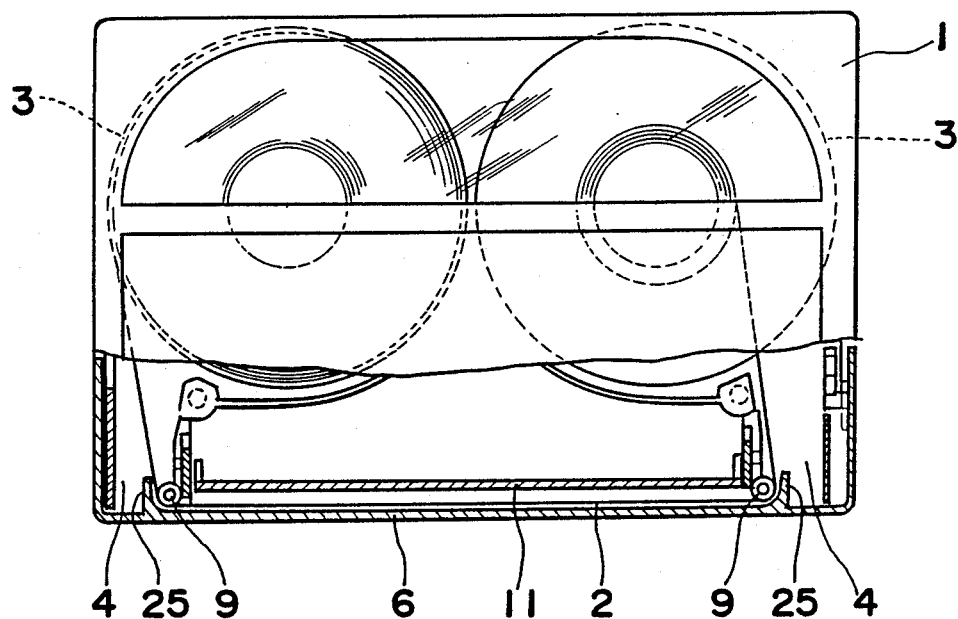
FIG. 20 is a top plan view showing a fourth modification of the tape cartridge according to the present invention.
Figure 21:
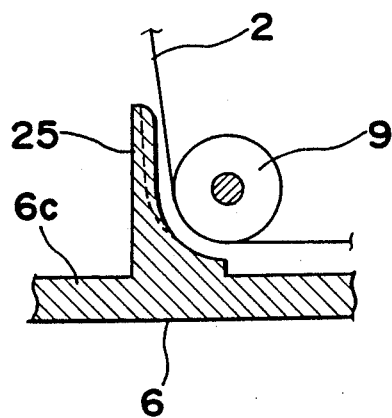
FIG. 21 is a partial cross sectional view showing a wall member used in the fourth modification.
Figure 22:
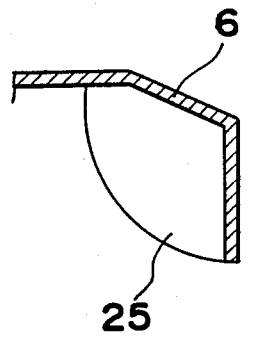
FIG. 22 is a side view showing an essential portion of the fourth embodiment.

Referring to FIGS. 20 and 21 showing the fourth modification of the particle entrance preventing arrangement, in which a pair of cover members 25 like a straight plate is provided integral with the front lid 6 for extending inwardly from the inner wall 6c of the front lid 6 so as to face the tape path regulating pins 9. The cover members 25 are made of plastic resin material. Since the cover members 25 are relatively hard, it is desired that the magnetic tape 2 does not contact with the cover member 25, whereby the cover member 25 is situated close to but slightly away from the magnetic tape 2 engaged with the tape path regulating pin 9.

The cover member 25 has its free end to the branched portion rounded as shown in FIG. 21. The reason for this will be explained below. After the magnetic tape cartridge is used for recording or reproducing, when the front lid 6 and rear lid 11 are moved downward to the closing position, assuming that the free end of the cover member 25 is sharply squared, if the magnetic tape 2 is partly loosened (although there does not occur a large amount of loosening of the tape since the tape reels 3 are braked by a stopper mechanism when the recording or reproducing operation is completed), the magnetic tape 2 may be undesirably engaged with the free end portion of the cover member 25 and the magnetic tape 2 may be crushed. In order to avoid the problem mentioned above, the free end of the cover member 25 is rounded so that the magnetic tape can pass the cover member 25 smoothly by the round portion even if the magnetic tape 2 contacts with the cover member 25.

Figure 23:
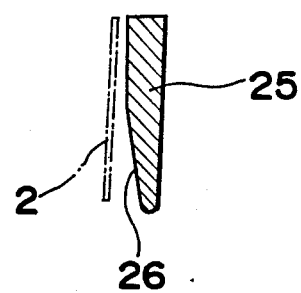
FIG. 23 is a cross sectional view showing an essential portion of the fourth embodiment.
Figure 24:
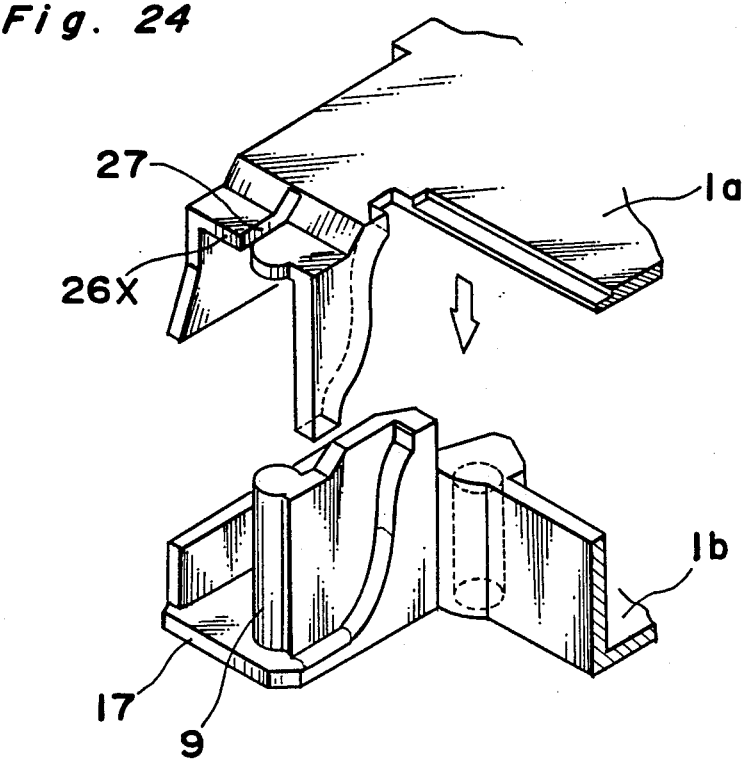
FIG. 24 is a partial exploded view showing the fourth modification.

As shown in FIG. 23, the cover member 25 has its lower portion of one side which faces to the magnetic tape 2 is slanted so as to provide a guide surface 26, whereby the magnetic tape 2 is shifted toward the tape path regulating pin 9 even if the tape is loosened a little. As shown in FIG. 24, on the top wall 26x of the top case half 1a, there is defined a slit 27 at a position facing to the cover member 25 for allowing to pass the cover member 25.

As shown in FIG. 25, the surface of the cover member 25 having the guide wall 26 may be coated with a lubricant layer 28 made of for example, a fluorine containing resin film.

Fifth modification

FIG. 25 shows a further modification of the particle entrance preventing arrangement of the present invention. In this modification, a soft resilient member 29 is attached on the surface of the cover member 25 facing to the tape path regulating pin 9 by means of such as adhering method. The soft resilient member 29 is adapted to directly contact with the magnetic tape 2 suspended on the tape path regulating pin 9.

Sixth modification

FIG. 27 shows a further modification of the particle entrance preventing arrangement of the present invention. In this modification, the cover member 25 having generally L character shape in plan view and made of soft resilient material is attached to the inner surface of the front lid 6 by such as adhering method.

Seventh modification

FIG. 28 shows a further modification of the particle entrance preventing arrangement of the present invention. As shown in FIG. 28, the cover member 25 of a cubic shape made of soft and resilient material covers almost entire tape drawing opening 4.

As the fiber for forming the soft resilient member, there may be used vegetable fiber such as cotton, animal fiber such as sheep wool, regenerated fiber such as viscose rayon, semisynthetic fiber such as acetate, inorganic fiber such as carbon fiber and synthetic fiber such as polyamide, polyvinyl arcohol.

As the resilient member, there may be used dien system rubber such as styrene-butadiene rubber, olefin system rubber such as butyl rubber, silicone rubber, urethane rubber, polyvinylchloride rubber, polyethylene rubber, polypropylene rubber and polyamide rubber.

As the resilient member, there may be used an elastomer in which active carbon particles are dispersed, felt or cloth made of active carbon fibers or mixture of the active carbon fibers and other fibers.

The elastomer containing active carbon dispersed therein includes polyether type polyurethane foam, polyester type polyurethane or plastic foam which contains the active carbon such as coconut shell active carbon dispersed therein or adhered thereto. The contained amount of the active carbon particles is 20 to 70% by weight with the property of the particles as listed in the table 1.

TABLE 1

| specific surface area (mm$^2$/g) | 700 to 1600 |
| --- | --- |
| porous volume (cm$^3$/g) | 0.45 to 1.4 |
| average porous diameter (Å) | 20 to 60 |
| percentage of voids | 0.45 to 0.7 |

The property of the active carbon used in the resilient member is listed in the table 2

TABLE 2

| degree of fineness ($\mu$) | 8 to 10 |
| --- | --- |
| fiber strength (kg/mm$^2$) | 30 to 40 |
| elasticity (kg/mm$^2$) | 1200 to 1400 |
| specific surface area (m$^2$/g) | 1000 to 2500 |
| volume of porous (cm$^3$/g) | 0.22 to 1.20 |
| average porous diameter (Å) | 18 to 44 |
| amount of adsorption of benzene (wt %) | 22 to 90 |

Eighth modification

Figure 29:
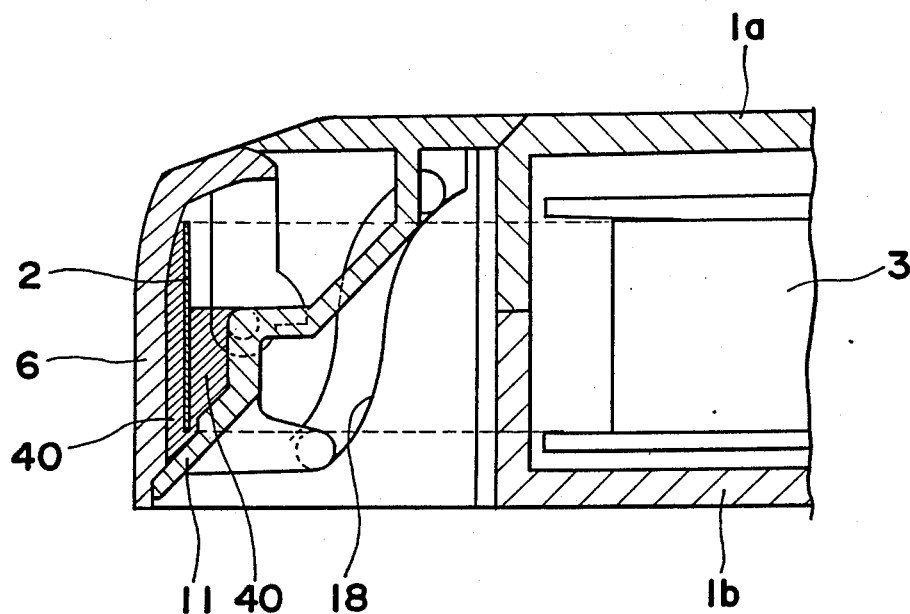
FIG. 29 is a cross sectional view showing a eighth modification.

FIG. 29 shows a further modification of the particle entrance preventing arrangement of the present invention.

There are adhered sheet like entrance preventing members 40 on the front surface of the rear lid 11 and inner surface of the front lid 6 respectively over the almost entire length of the front lid 6 or rear lid 11 for preventing the entrance of the floating harmful particles into the cartridge case. The entrance preventing member 40 may be located partially along the front lid or rear lid.

When the magnetic tape cartridge is not used, the entrance preventing member 40 directly contacts with the entire front surface or the magnetic layer side and a part of the rear surface or back coat surface of the magnetic tape 2, so that at lease the lower edge portion of the magnetic tape 2 is resiliently clamped and protected by the entrance preventing members 40 in a sandwich manner.

The entrance preventing members 40 are provided with the property for ability of preventing entering of the floating particles into the cartridge case 1.

As the material for the entrance preventing member 40, there may be used filter, resilient sheet, shaped sponge, leather, non woven cloth and resilient coating film. As the fiber and resilient member, there may be used the materials mentioned in the seventh modification. The property of the active carbon particles and active carbon fibers may be the same those used in the seventh modification.

The entrance preventing member 40 may be impregnated with same rust preventives as used in the respective embodiments and modifications mentioned above.

It may be possible to impregnate lubricants solely or with the rust preventives in the entrance preventing member 40. The same lubricants used in the respective embodiments and modifications mentioned above may be used.

Ninth modification

Figure 30:
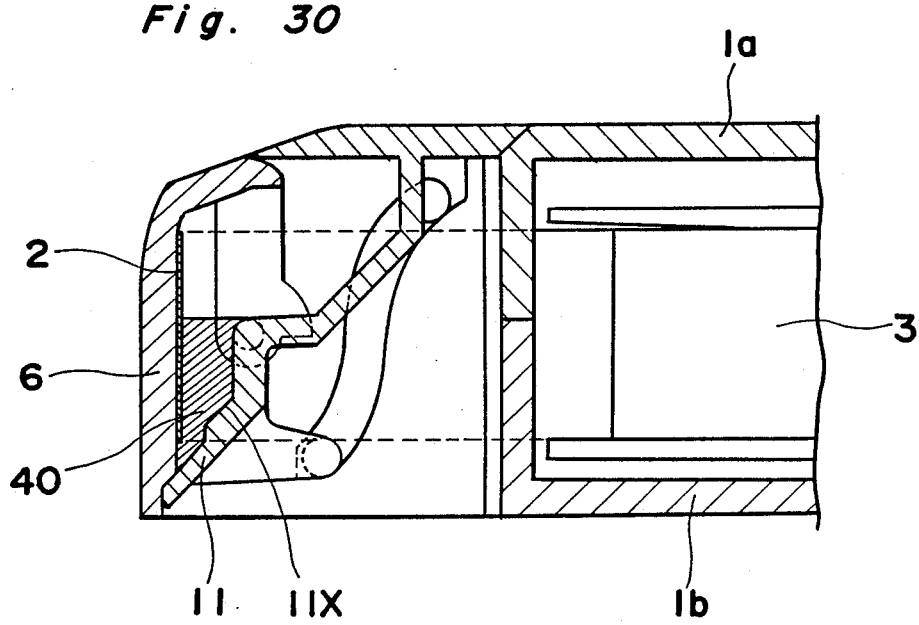
FIG. 30 is a cross sectional view showing a ninth modification.

FIG. 30 shows a further modification of the entrance preventing member 40 which is provided only on the slanted wall 11x of the rear lid 11. When the tape cartridge is not used, a part of the magnetic tape drawn out of the cartridge case 1 is sandwiched and clamped by the entrance preventing member 40, therefore the floating harmful particles in the air do not enter and fix onto the magnetic layer of the magnetic tape 2.

Tenth modification

Figure 31:
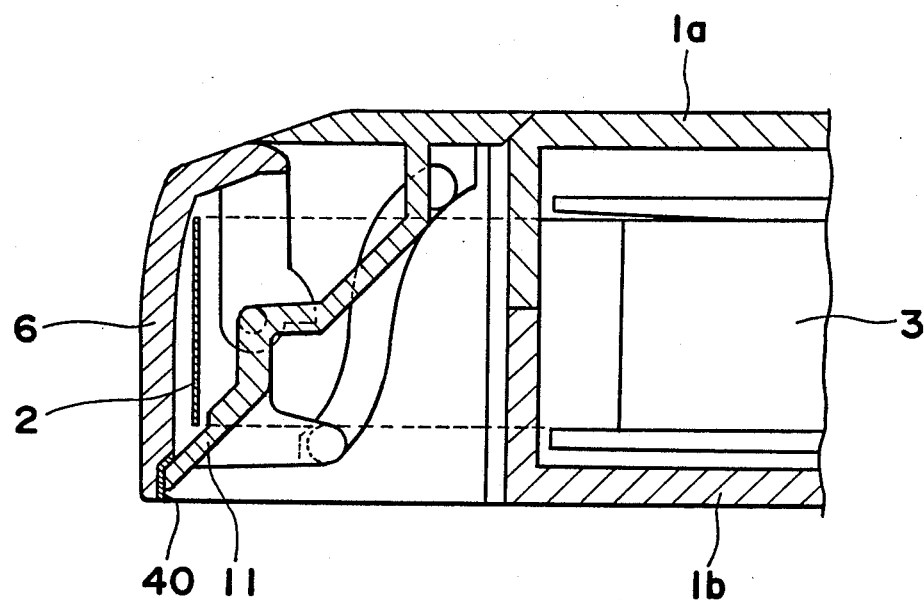
FIG. 31 is a cross sectional view showing a tenth modification.

FIG. 31 shows a further modification of the entrance preventing member 40, which is secured to the surface of the lower portion of the front lid facing to the rear lid 11, so that when the tape cartridge is not used, the entrance preventing member 40 prevents entrance of the floating harmful particles from entering into the inside of the cartridge case 1, whereby the magnetic tape can be protected from the corrosion by the harmful particles.

Eleventh modification

Figure 32:
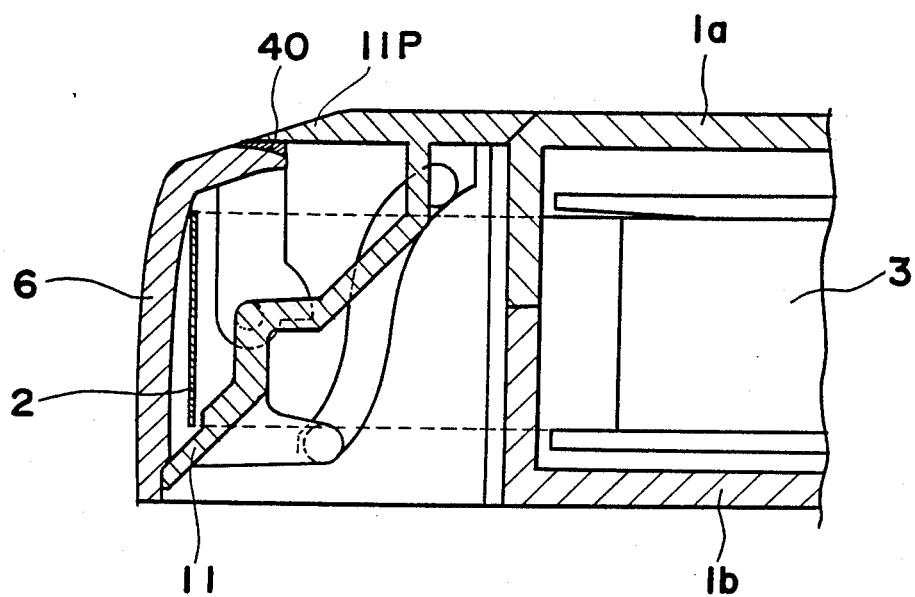
FIG. 32 is a cross sectional view showing an eleventh modification.

FIG. 32 shows a further modification of the entrance preventing member 40, which is secured to the top free end of the front lid 6 so as to close the gap between the opposing portion between the top free end of the front lid 6 and the front end of the projected member 11p of the rear lid 11. The floating harmful particles in the air are prevented from entering into the cartridge case 1. The entrance preventing member 40 may be secured to the front end of the projected member 11p of the rear lid 11.

It is noted that as the entrance preventing arrangement, there may be employed a combination of the eighth modification shown in FIG. 29 and eleventh modification shown in FIG. 32, a further combination of the ninth modification shown in FIG. 30 and eleventh modification shown FIG. 32 and a still further combination of the tenth modification shown in FIG. 31 and eleventh modification shown in FIG. 32.

Twelfth modification

Figure 33:
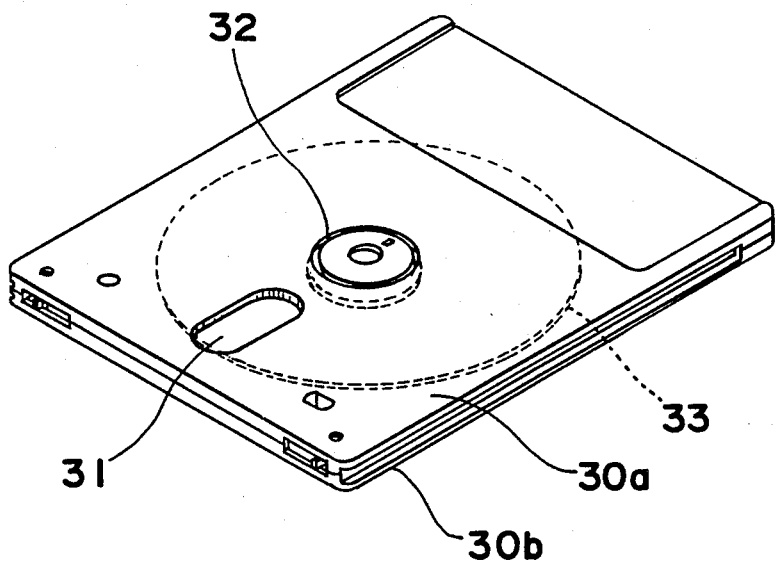
FIG. 33 is a perspective view showing a disc cartridge to which an essential portion of the present invention is employed.
Figure 34:
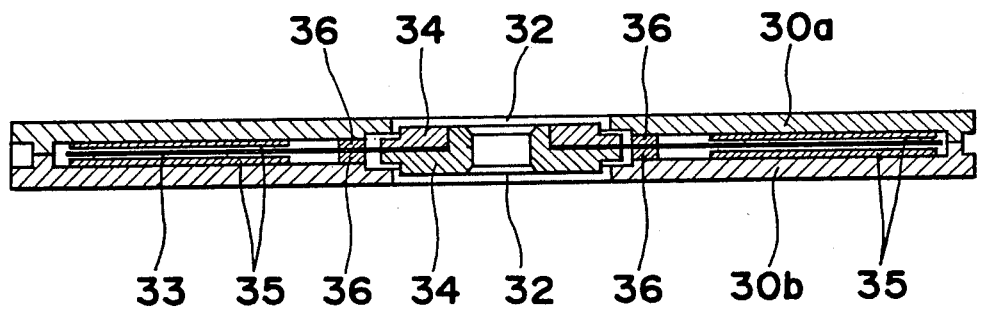
FIG. 34 is a cross sectional view showing an essential portion of the disc cartridge show in in FIG. 33.

FIGS. 33 and 34 show an example in which the essential arrangement of the particle entrance preventing arrangement according to the present invention is employed in a magnetic disc cartridge. As shown in FIGS. 33 and 34, a cartridge case is formed by a top case half 30a and a bottom case half 30b and there are defined a head insertion hole 31 and a drive window 32 at respective positions as shown in FIG. 33. Inside the cartridge case, a magnetic disc 33 is rotatably accommodated with the inner periphery held by a hub 34 made of a pair of upper and lower halves. There are adhered cleaning sheets 35 respectively on the inner surfaces of the top case half 1a and bottom case half 1b.

On the inner surfaces of the top case half 1a and the bottom case half 1b of the disc cartridge, there are secured entrance preventing members 36 of an annular shape around the openings such as head insertion hole 31 and drive opening 32 through which the floating harmful particles may enter, The respective entrance preventing members 36 are so provided that they rotatably and resiliently clamp the magnetic disc 33 with a slight force. The respective entrance preventing members 36 may be made of the material employed in the various modifications mentioned above with the rust preventives and/or lubricants contained.

By the arrangement shown in FIGS. 33 and 34, the floating harmful particles are prevented from entering into the inside of the disc cartridge by the entrance preventing members 36, whereby corrosion of the magnetic disc can be prevented.

The arrangement shown in FIGS. 33 and 34 and their modifications may be employed to optical disc device using recoding layer of the reversible magnetization type made of Gd-Co, Tb-Fe, Tb-Fe-Co, Gd-Tb-Fe, Tb-Dy-Fe.

As mentioned above, since the clearance S or clearances between at least a lower part of the side edges 11a and 11b of the rear lid 11 and the rear lid guide walls 5a and 5b are adapted to be covered by the particle entrance preventing member 50 provided one of or both of the rear lid 11 and case body 1, it is possible to prevent the corrosion of a part of the magnetic tape facing to the clearance or clearances due to the floating harmful particles can be prevented assuring smooth movement of the rear lid by means of the clearance.

What is claimed is:

1. A tape cartridge comprising a case body having a pair of tape drawing openings defined on a front part of said case body, a magnetic tape containing a magnetic layer made of metallic material and lid means including a front lid and a rear lid assembled movably on said case body between a closed position and an open position for covering, when said tape cartridge is not in use, both faces of said magnetic tape which is drawn out of said case body through said tape drawing openings and extending along said front part of said case body, each side end of said rear lid opposing to each inner face of side walls of said case body having a clearance therebetween, wherein said tape cartridge comprises a particle entrance preventing means for covering said clearance so that said particle entrance preventing means prevents the entrance of harmful floating particles into said tape cartridge about said tape.

2. The tape cartridge according to claim 1, wherein said particle entrance preventing means is assembled on said case body in such a manner that said particle entrance preventing means engages with both side ends of said rear lid.

3. The tape cartridge according to claim 1, wherein said particle entrance preventing means is attached to both sides of said rear lid so that said particle entrance preventing means engages with both sides edges of said rear lid.

4. The tape cartridge according to claim 1, wherein particle entrance preventing means are provided on both of said case body and rear lid.

* * * * *